United States Patent
Singh et al.

(10) Patent No.: US 11,346,253 B2
(45) Date of Patent: May 31, 2022

(54) LINER APPARATUS AND METHOD OF INSPECTING AND/OR CLEANING A LINER ANNULAR REGION

(71) Applicant: United Technologies Corporation, Farmington, CT (US)

(72) Inventors: Anshuman Singh, Edmond, OK (US); Rachelle Parsons, Broad Brook, CT (US); Mahamoud Coulibaly, East Hartford, CT (US); Daniel Cheng, West Hartford, CT (US); Paul Rosencrans, Norman, OK (US)

(73) Assignee: Raytheon Technologies Corporation, Farmington, CT (US)

( * ) Notice: Subject to any disclaimer, the term of this patent is extended or adjusted under 35 U.S.C. 154(b) by 325 days.

(21) Appl. No.: 16/362,144

(22) Filed: Mar. 22, 2019

(65) Prior Publication Data

US 2020/0300125 A1    Sep. 24, 2020

(51) Int. Cl.
*F01D 25/26* (2006.01)
*B08B 5/04* (2006.01)
*F01D 25/24* (2006.01)

(52) U.S. Cl.
CPC ............... *F01D 25/26* (2013.01); *B08B 5/04* (2013.01); *F01D 25/24* (2013.01); *F05D 2220/32* (2013.01); *F05D 2230/72* (2013.01); *F05D 2240/14* (2013.01); *F05D 2260/202* (2013.01)

(58) Field of Classification Search
CPC .......... F01D 25/12; F01D 25/14; F01D 25/24; F01D 25/26; F01D 21/045; B08B 5/00–046; F05D 2220/32; F05D 2230/72; F05D 2240/14; F05D 2260/202; F05D 2260/607; F02K 1/82; F02K 1/822
See application file for complete search history.

(56) References Cited

U.S. PATENT DOCUMENTS

| | | |
|---|---|---|
| 2,639,579 A | 5/1953 | Willgoos |
| 2,865,167 A | 12/1958 | Worobel |
| 5,067,324 A | 11/1991 | Beytes |
| 6,199,371 B1 * | 3/2001 | Brewer .................. F23R 3/002 60/766 |
| 6,925,808 B2 * | 8/2005 | Tiemann .................. F23M 7/04 60/722 |

(Continued)

OTHER PUBLICATIONS

EP search report for EP20153232.2 dated Aug. 10, 2020.

*Primary Examiner* — Woody A Lee, Jr.
*Assistant Examiner* — Elton K Wong
(74) *Attorney, Agent, or Firm* — Getz Balich LLC

(57) ABSTRACT

A liner for a gas turbine engine is provided that includes an outer wall, an inner wall, and a plurality of structural elements disposed between the inner wall and the outer wall. The outer wall is spaced apart from the inner wall and is disposed radially outside of the inner wall. The outer wall and inner wall form an annular structure having a circumference, and an annular region disposed between the first interior surface of the outer wall and the second interior surface of the inner wall. Each of the structural elements is attached to the outer wall and the inner wall. The outer wall includes at least one inspection port extending through the outer wall configured for access to the annular region disposed between the first interior surface of the outer wall and the second interior surface of the inner wall.

7 Claims, 2 Drawing Sheets

(56) References Cited

U.S. PATENT DOCUMENTS

| | | | |
|---|---|---|---|
| 2006/0112676 A1* | 6/2006 | Cowan | F02K 1/82 60/266 |
| 2006/0196188 A1* | 9/2006 | Burd | F23R 3/06 60/754 |
| 2014/0109592 A1 | 4/2014 | Senofonte | |
| 2018/0223674 A1* | 8/2018 | Taylor | F01D 5/186 |

* cited by examiner

LINER APPARATUS AND METHOD OF INSPECTING AND/OR CLEANING A LINER ANNULAR REGION

This invention was made with Government support under N00019-02-C-3003 awarded by the United States Navy. The Government has certain rights in this invention.

BACKGROUND OF THE INVENTION

1. Technical Field

The invention relates to gas turbine engines in general, and to the liners utilized within a gas turbine engine in particular.

2. Background Information

Liners are often employed in gas turbine engines to enclose high temperature, core gas paths. In many applications (e.g., exhaust nozzle, augmentor, etc.) the liners are configured to form an enclosed gas path that may be cylindrical or nearly cylindrical in shape.

In many instances, the liner includes an outer wall, an inner wall, and structural elements disposed between and attached to the inner and outer walls. The outer wall is disposed radially outside of the inner wall. The structural elements (typically referred to as "stiffeners") disposed between the walls add structural rigidity to the liner. Each stiffener may be attached to the respective wall by a variety of techniques, but very often the stiffeners are attached by rivets. The walls and the stiffeners collectively form a stiff cylindrical structure that defines an interior passage through which core gas flows during operation of the engine. The stiffeners protect the liner from buckling or collapsing under differential pressure loads across the liner; e.g., a difference in pressure between the enclosed interior core gas passage region defined by the liner and the region disposed outside of the liner. For example, during a stall condition, the air pressure surrounding the outer wall of the liner ($P_{outer}$) is substantially higher than the air pressure within the interior liner region ($P_{interior}$); (e.g., $P_{outer} > P_{interior}$). If the difference in pressure across the liner is great enough, the liner could deform.

In many applications, the liner may be cooled to mitigate or prevent thermal issues. For example, both the inner and outer wall may include cooling apertures. A source of air ("cooling air") at a higher pressure but lower temperature than the core gas flow passing through the enclosed liner interior passage may be disposed outside the liner. The higher pressure forces the cooling gas through the cooling apertures disposed in the outer wall and into the annular region defined between the inner and outer walls. The higher pressure also forces the cooling gas to exit the liner annular region through the cooling apertures disposed in the inner wall and into the core gas path.

During operation of the gas turbine engine, it is possible that a foreign object debris ("FOD") may be ingested into and passed through the gas turbine engine. The foreign object, such as a bird, is often shredded into very small pieces as it passes through the gas turbine engine potentially causing damage to the gas turbine engine components. Under certain circumstances, some of the FOD can be displaced into the liner cooling apertures and/or into the annular region disposed between the inner and outer walls. The aforesaid debris can detrimentally affect the liner by clogging cooling apertures, etc. In addition, in some instances other undesirable debris can be displaced into the annular region disposed between the inner and outer walls.

What is needed is a method for determining the presence of debris within the annular region of the liner, one that permits testing of the cooling apertures to determine blockage, and one that permits debris to be removed from the annular region of the liner.

SUMMARY OF THE INVENTION

According to an aspect of the present disclosure, a liner for a gas turbine engine is provided that includes an outer wall, an inner wall, and a plurality of structural elements disposed between the inner wall and the outer wall. The outer wall is spaced apart from the inner wall and is disposed radially outside of the inner wall. The outer wall and inner wall form an annular structure having a circumference, and an annular region disposed between the first interior surface of the outer wall and the second interior surface of the inner wall. Each of the structural elements is attached to the outer wall and the inner wall. The outer wall includes at least one inspection port extending through the outer wall configured for access to the annular region disposed between the first interior surface of the outer wall and the second interior surface of the inner wall.

According to another aspect of the present disclosure, a gas turbine engine is provided that includes a fan section, a compressor section, a combustor section, a turbine section, and a liner disposed aft of the turbine section. The liner includes an outer wall, an inner wall, and a plurality of structural elements disposed between the inner wall and the outer wall. The outer wall is spaced apart from the inner wall and is disposed radially outside of the inner wall. The outer wall and inner wall form an annular structure having a circumference, and an annular region disposed between the first interior surface of the outer wall and the second interior surface of the inner wall. Each of the structural elements is attached to the outer wall and the inner wall. The outer wall includes at least one inspection port extending through the outer wall configured for access to the annular region disposed between the first interior surface of the outer wall and the second interior surface of the inner wall.

In any of the aspects or embodiments described above and herein, the outer wall includes first cooling apertures, and wherein the at least one inspection port disposed in the outer wall has an area that is greater than the area of any of the first cooling apertures.

In any of the aspects or embodiments described above and herein, the at least one inspection port is configured to be uncovered during operation of the gas turbine engine.

In any of the aspects or embodiments described above and herein, further including at least one an inspection port cover attached to the outer wall to cover at least a portion of a respective one of the at least one inspection port.

In any of the aspects or embodiments described above and herein, the plurality of structural elements may extend around the circumference of the annular structure, and define a plurality of independent annular sub-regions, and at least one of the independent annular sub-regions includes the at least one inspection port disposed in a portion of the outer wall of the respective annular sub-region.

In any of the aspects or embodiments described above and herein, the at least one inspection port is no more than four inspection ports.

In any of the aspects or embodiments described above and herein, each of the plurality of independent annular sub-regions includes at least one said inspection port disposed in the portion of the outer wall of the respective annular sub-region.

In any of the aspects or embodiments described above and herein, the at least one inspection port in a respective one of the independent annular sub-regions is a single said inspection port and has a first area, and the respective one of the independent annular sub-regions includes an outer wall portion and a plurality of first cooling apertures disposed in the outer wall portion, and wherein the first cooling apertures disposed within the outer wall portion have a collective second area, and the first area is less than about ten percent (10%).

In any of the aspects or embodiments described above and herein, the first area may be less than about six percent (6%) of the second area.

In any of the aspects or embodiments described above and herein, the first area may be greater than about two percent (2%) of the second area.

In any of the aspects or embodiments described above and herein, the first area may be greater than about four percent (4%) of the second area.

In any of the aspects or embodiments described above and herein, the first area may be in a range of about two percent (2%) to about ten percent (10%) of the second area.

In any of the aspects or embodiments described above and herein, an inspection port may be configured to be uncovered during operation of the gas turbine engine.

In any of the aspects or embodiments described above and herein, the at least one inspection port in a respective one of the independent annular sub-regions may be a plurality of said inspection ports, each said inspection port having a first area, and the collective first areas is a second area. The respective one of the independent annular sub-regions includes an outer wall portion and a plurality of first cooling apertures disposed in the outer wall portion, and the first cooling apertures disposed within the outer wall portion have a collective third area, and the second area is less than about ten percent (10%) of the third area.

In any of the aspects or embodiments described above and herein, the first area may be less than about six percent (6%) of the second area.

In any of the aspects or embodiments described above and herein, the second area may be greater than about two percent (2%) of the third area.

In any of the aspects or embodiments described above and herein, the second area may be greater than about four percent (4%) of the third area.

In any of the aspects or embodiments described above and herein, the second area may be in a range of about two percent (2%) to about ten percent (10%) of the third area.

In any of the aspects or embodiments described above and herein, an inspection port cover may be provided, wherein the at least one inspection port in a respective one of the independent annular sub-regions is a single said inspection port and has a first area, and the respective one of the independent annular sub-regions includes an outer wall portion and a plurality of first cooling apertures disposed in the outer wall portion, and wherein the first cooling apertures disposed within the outer wall portion have a collective second area, and the first area is greater than about ten percent (10%) of the second area, and wherein the inspection port cover is attached to the outer wall and covers at least a portion of the inspection port.

In any of the aspects or embodiments described above and herein, a plurality of inspection port covers may be provided, wherein the at least one inspection port in a respective one of the independent annular sub-regions is a plurality of said inspection ports, each said inspection port having a first area, and the collective first areas is a second area, and the respective one of the independent annular sub-regions includes an outer wall portion and a plurality of first cooling apertures disposed in the outer wall portion, and wherein the first cooling apertures disposed within the outer wall portion have a collective third area, and the second area is greater than about ten percent (10%) of the third area, and wherein each of the plurality of inspection port covers is attached to the outer wall and covers at least a portion of a respective one of the inspection ports.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical and/or mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Figure 1:
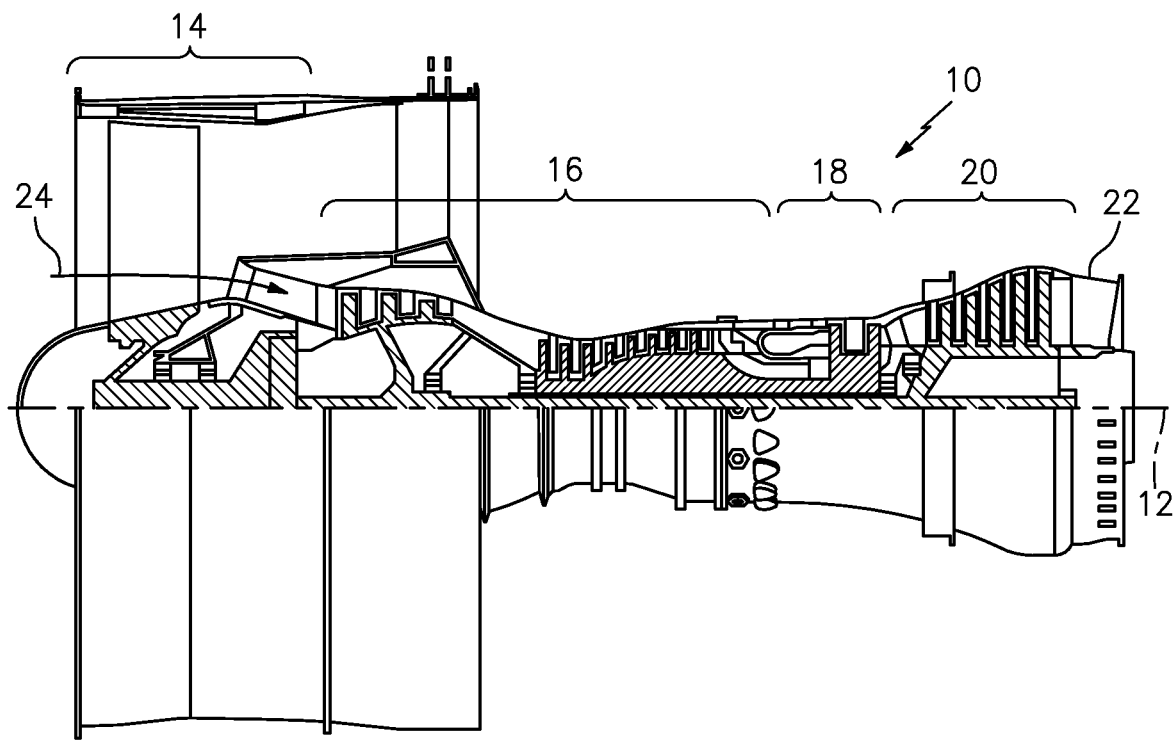
FIG. 1 is a partially sectioned diagrammatic view of a gas turbine engine.

FIG. 1 is an axial partially sectioned diagrammatic view of a gas turbine engine 10 including a longitudinal engine axis 12, a fan section 14, a compressor section 16, a combustor section 18, a turbine section 20, and an exhaust nozzle 22. The compressor section 16 includes a low pressure compressor and a high pressure compressor. The turbine section 20 typically a low pressure turbine and a high pressure turbine. A low speed spool typically connects the fan section 14 and the low pressure compressor to the low pressure turbine. In some embodiments, the low speed spool may be connected to the fan section through a speed change mechanism (e.g., a geared architecture that drives the fan section 14 at a lower rotational speed than the low speed spool). A high speed spool connects the high pressure compressor to the high pressure turbine. The combustor section 18 is disposed between the high pressure compressor and the high pressure turbine. The low speed spool and the high speed spools are typically concentric and rotate about the engine longitudinal axis.

During operation of engine 10, a gas stream 24, initially comprised of air, is drawn into the front of engine 10 by rotation of fan blades disposed within the fan section 14. The fan section 14 directs a portion of the gas stream 24 into the compressor section 16. The gas stream 24 is successively compressed through compressor section 16 stages, and a portion of the gas stream 24 is directed into the combustor section 18. A portion of the gas stream 24 may be bled off of the compressor, or off the fan, to provide air at an elevated pressure for use aft in the engine 10, such as for cooling of a liner as will be described below. In combustor section 18, the now-compressed gas stream 24 is mixed with fuel and ignited thereby significantly raising the temperature of the gas stream 24. The gas and fuel mixture ignited in the combustor section 18 is directed into the turbine section 20 in which the gas stream 24 that now includes air, combustion products, etc., sometimes referred to as "core gas", is successively expanded. The high pressure turbine extracts energy from the gas stream 24 to power the high pressure compressor via the high speed spool. The low pressure turbine extracts energy from the gas stream 24 to power the fan section 14 and the compressor section 16 via the low speed spool. The gas stream 24 subsequently exits the engine 10, producing useful thrust for engine 10.

The gas turbine engine 10 described above and shown in FIG. 1 is a non-limiting example of a gas turbine engine that may include aspects of the present disclosure. The present disclosure is not limited to any particular gas turbine engine 10 embodiment. A turbofan gas turbine engine, a ramjet gas turbine engine, a gas turbine engine with a geared architecture for driving the fan, a gas turbine engine with an augmentor, and the like are all contemplated herein.

Figure 2:
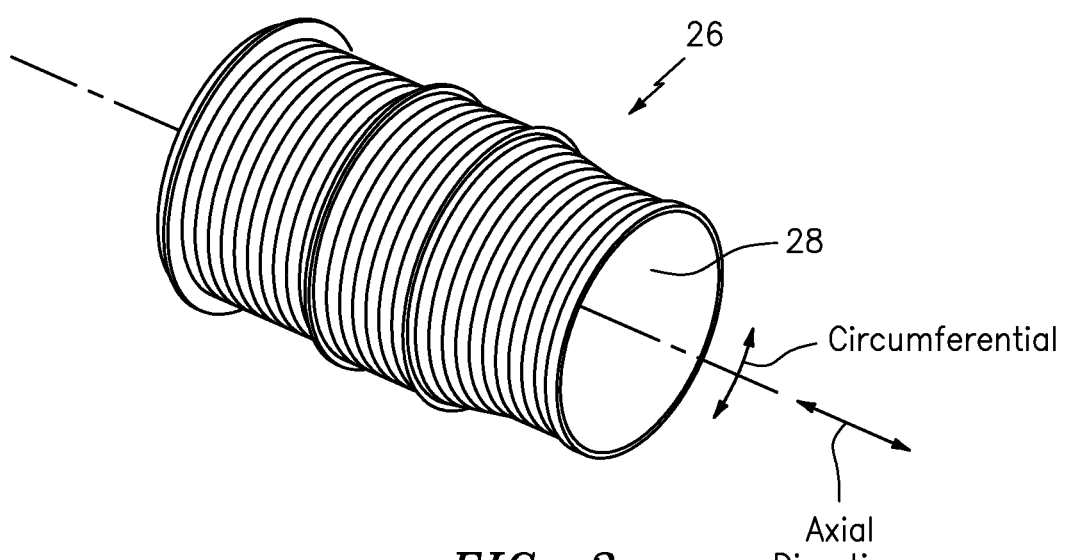
FIG. 2 is a diagrammatic perspective view of a liner embodiment.

A gas turbine engine 10 may include one or more liners 26 (e.g., exhaust nozzle liner, augmentor liner, etc.) configured to define enclosed core gas paths 28. In many applications, a liner 26 may be configured to define an enclosed gas path that is cylindrical or nearly cylindrical in shape. A non-limiting example of a cylindrical liner 26 that is configured to define an enclosed gas path is shown in FIG. 2.

Figure 3:
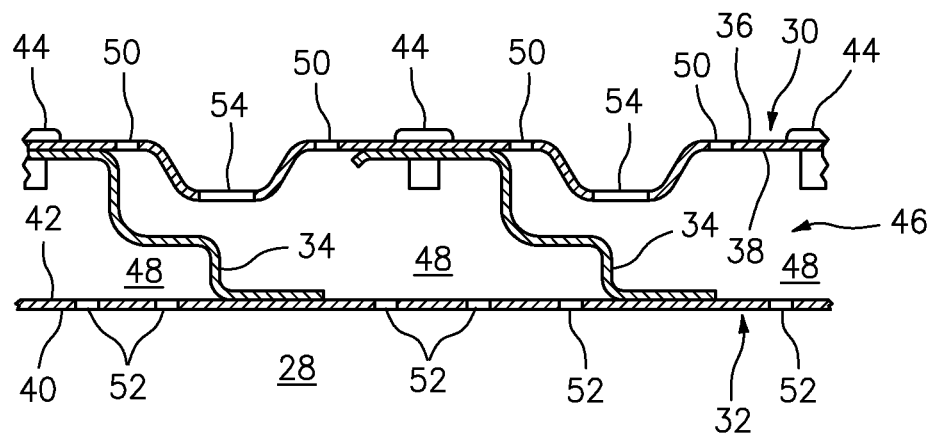
FIG. 3 is a diagrammatic sectioned partial view of a liner embodiment.

Referring to FIG. 3, the liner 26 includes an outer wall 30, an inner wall 32, and structural elements 34 disposed between and attached to the inner and outer walls 32, 30. In liner embodiments like those shown in FIGS. 2 and 3, the outer wall 30, an inner wall 32, and structural elements 34 all extend circumferentially around the entirety of the liner 26. The outer wall 30 is disposed radially outside of and spaced apart from the inner wall 32. The outer wall 30 has an exterior surface 36 and an interior surface 38. The thickness of the outer wall 30 extends between the exterior surface 36 and the interior surface 38, extending along a line perpendicular to the exterior surface 36 and the interior surface 38. The inner wall 32 has an exterior surface 40 and an interior surface 42. The thickness of the inner wall 32 extends between the exterior surface 40 and the interior surface 42, extending along a line perpendicular to the exterior surface 40 and the interior surface 42. The structural elements 34, typically referred to as "stiffeners", are disposed between the walls 30, 32 and may be attached to the interior surface 38, 42 of each respective liner wall 30, 32 by a variety of techniques such as, but not limited to, welding, rivets or other mechanical fasteners, bonding agent, etc. In the liner 26 cross-section shown in FIG. 3, for example, the outer wall 30 is attached to the stiffeners 34 by rivets 44, and the inner wall 32 is attached to the stiffeners 34 by weld or braze. The walls 30, 32 and the stiffeners 34 of the liner 26 collectively form a relatively stiff cylindrical liner structure that defines an interior passage 28, as shown in FIG. 2, through which core gas flows during operation of the engine 10. The walls 30, 32 of the liner 26 also collectively form an annular region 46 defined between the inner and outer walls 32, 30. Within the annular region 46 defined between the inner and outer walls 32, 30, the stiffeners 34 create independent annular sub-regions 48. These annular sub-regions 48 typically extend around the circumferential entirety of the liner 26, such that air within an annular sub-region 48 is free to travel around the circumference of the annular sub-region 48.

In some embodiments, the liner 26 may be configured to permit the passage of air (e.g., cooling air) through the liner 26 to cool the liner 26 and/or act as a source of air into the core gas path 28. As shown in FIG. 3, an outer wall 30 may include cooling apertures 50 extending through the thickness of the outer wall 30. The cooling apertures 50 disposed in the outer wall 30 are spaced apart from one another (typically uniformly spaced) and disposed around the circumference of the liner 26. In some embodiments, all of the annular sub-regions 48 have an outer wall 30 portion that includes cooling apertures 50. In some embodiments, less than all of the annular sub-regions 48 have an outer wall 30 portion that includes cooling apertures 50. Also as shown in FIG. 3, an inner wall 32 may include cooling apertures 52 extending through the thickness of the inner wall 32. The cooling apertures 52 disposed in the inner wall 32 are spaced apart from one another (typically uniformly spaced) and disposed around the circumference of the liner 26. All of, or less than all of, the annular sub-regions 48 may have an inner wall 32 portion that includes cooling apertures 52. Typically, those annular sub-regions 48 with an outer wall 30 portion that includes cooling apertures 50, also have an inner wall 32 portion that includes cooling apertures 52.

According to an aspect of the present disclosure, a liner 26 includes at least one inspection port 54 disposed within the outer wall 30 portion of at least one annular sub-region 48. In some applications, a liner 26 includes at least one inspection port 54 disposed within the outer wall 30 portion of each annular sub-region 48. In some embodiments, an annular sub-region 48 may include a plurality of inspection ports 54 disposed within the outer wall 30 portion of that annular sub-region 48. In some embodiments of the present disclosure, the liner 26 includes at least one and no more than four inspection ports 54 disposed within the outer wall 30 portion of each annular sub-region 48. The circumferential positioning of the inspection ports 54 can vary depending on the application, but is typically chosen to avoid or mitigate undesirable deficit to the mechanical strength of the liner 26. The inspection port 54 is sized to permit access to the annular sub-region 48 by inspection tools and/or cleaning tools. To illustrate, a technician inspecting a liner 26 may insert an optical inspection device such as a borescope through the inspection port 54 and thereafter throughout the annular sub-region 48. The borescope typically has a flexible tube with an eyepiece on one and an objective lens and/or a camera on the other end. The inspection port 54 permits the technician to insert the eyepiece end of the borescope into the annular sub-region 48 and to maneuver the eyepiece throughout the circumference of the annular sub-region 48. As another example, the inspection port 54 may be sized to allow access to the annular sub-region 48 by a vacuum device that is configured to remove any debris such as FOD, rivets, etc. that may be present within the annular sub-region 48. As yet another example, the inspection port 54 may be sized to enable a fluid flow testing device to access the annular sub-region 48. As stated above, an annular sub-region 48 may include cooling apertures 50, 52 in both the inner and outer wall regions 32, 30 that define the annular sub-region 48. For a variety of reasons, cooling apertures 50, 52 may become partially or fully clogged. A testing device utilizing the inspection port 54 may provide a source of air (or vacuum) to determine a fluid flow rate or pressure differential through the annular sub-region 48 and evaluate the annular sub-region 48 in view of that fluid flow or pressure characteristic by comparison to predetermined data, and/or other parameters. In this example, the inspection port 54 may be sized to enable a sufficient volumetric rate of air into or out of the inspection port 54 for purposes of the respective fluid flow test. The present disclosure is not limited to any particular inspection port 54 geometry. The area of the inspection port 54 is larger than any of the cooling apertures 50, 52 disposed within the outer wall 30 portion of the annular sub-region 48. For example, for those inspection ports 54 that are configured to permit borescope access to the annular sub-region 48, an inspection port 54 may have an area that permits ready access to a borescope having an 8 mm diameter to permit entry of a borescope eyepiece end having a 6 mm outer diameter. The present disclosure is not, however, limited to 8 mm diameter inspection ports 54.

Figure 4:
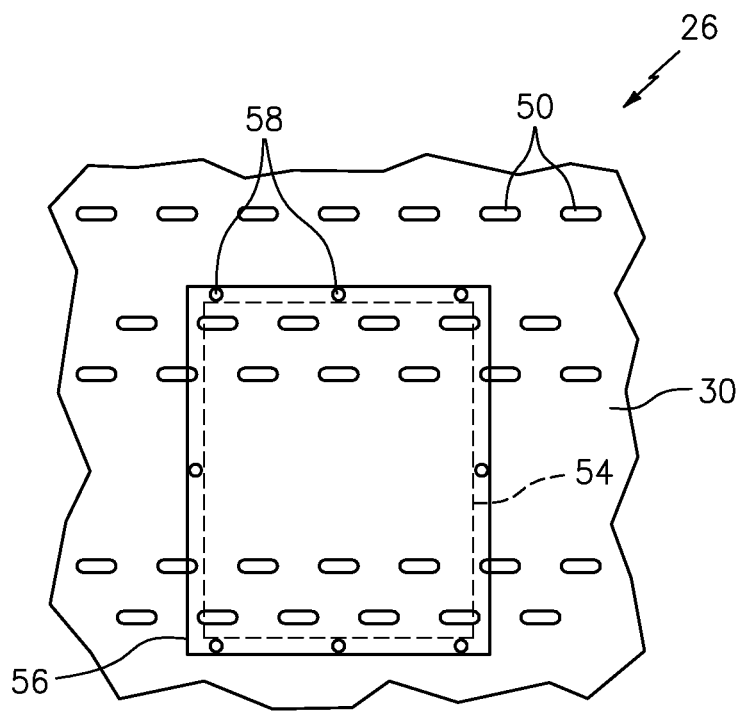
FIG. 4 is a partial view of a liner embodiment showing an inspection port cover in place.

In some embodiments, a liner 26 according to the present disclosure may include an open inspection port 54 that is configured to be uncovered during operation of the gas turbine engine 10 utilizing the liner 26. For example, if the area of an inspection port 54 within a given annular sub-region 48 is equal to or less than a predetermined percentage value, preferably about 10%, and more preferably equal to or less than about 6%, of the collective areas of all of the cooling apertures 50 disposed within the outer wall 30 portion of the same annular sub-region 48, the inspection port 54 may have an open, or uncovered, configuration. If a given annular sub-region 48 has more than one inspection port 54, and the collective area of the aforesaid inspection ports 54 is less than the predetermined percentage value of the collective areas of all of the cooling apertures 50 disposed within the outer wall 30 portion of the same annular sub-region 48, then the inspection ports 54 may each have an open, or uncovered, configuration. In most embodiments wherein there is a singular inspection port 54 disposed within the outer wall 30 portion of an annular sub-region 48, the area of the inspection port 54 is greater than about 2%, and more preferably greater than about 4%, of the collective areas of all of the cooling apertures 50 disposed within the outer wall 30 portion of the same annular sub-region 48. Hence, the area of a singular inspection port 54 within a given annular sub-region 48 is preferably within a range of about 2-10%, and more preferably within a range of about 4-6%, of the collective areas of all of the cooling apertures 50 disposed within the outer wall 30 portion of the same annular sub-region 48. Similarly, in most embodiments wherein there are a plurality of inspection ports 54 disposed within the outer wall 30 portion of an annular sub-region 48, the collective area of the inspection ports 54 is greater than about 2%, and more preferably greater than about 4%, of the collective areas of all of the cooling apertures 50 disposed within the outer wall 30 portion of the same annular sub-region 48. Hence, the collective areas of the plurality of the inspection ports 54 within a given annular sub-region 48 is preferably within a range of about 2-10%, and more preferably within a range of about 4-6%, of the collective areas of all of the cooling apertures 50 disposed within the outer wall 30 portion of the same annular sub-region 48. If the area of a singular inspection port 54 within a given annular sub-region 48 is greater than the predetermined percentage value of the collective areas of all of the cooling apertures 50 disposed within the outer wall 30 portion of the same annular sub-region 48, then the liner 26 may include an inspection port cover 56 (see FIG. 4) that covers at least a portion of the singular inspection port 54. A cover 56 that is configured to at least partially cover an inspection port 54 preferably covers the singular inspection port 54 to an extent that any remaining open portion (if present) of the singular inspection port 54 has an area that is equal to or less than the predetermined percentage value of the collective areas of all of the cooling apertures 50 disposed within the outer wall 30 portion of the same annular sub-region 48. As indicated above, in most embodiments the open area of the partially covered inspection port 54 is preferably greater than about 2%, and more preferably greater than about 4%, of the collective areas of all of the cooling apertures 50 disposed within the outer wall 30 portion of the same annular sub-region 48. Hence, the open area of the at least partially covered singular inspection port 54 within a given annular sub-region 48 is preferably within a range of about 2-10%, and more preferably within a range of about 4-6%, of the collective areas of all of the cooling apertures 50 disposed within the outer wall 30 portion of the same annular sub-region 48. If a given annular sub-region 48 has a plurality of inspection ports 54 within a given annular sub-region 48, and the collective areas of the aforesaid inspection ports 54 is greater than the predetermined percentage value of the collective areas of all of the cooling apertures 50 disposed within the outer wall 30 portion of the same annular sub-region 48, then the liner 26 may include an inspection port cover 56 for each of the inspection ports 54. Here again, each of the inspection port covers 56 may be configured to partially or completely cover a respective one of the inspection ports 54. If each inspection port cover 56 is configured to only partially cover a respective inspection port 54, then the aforesaid inspection port covers 56 preferably cover the inspection ports 54 to an extent that the remaining open portions have a collective area that is equal to or less than the predetermined percentage value of the collective areas of all of the cooling apertures 50 disposed within the outer wall 30 portion of the same annular sub-region 48. As indicated above, in most embodiments the collective open area of the at least partially covered inspection ports 54 is preferably greater than about 2%, and more preferably greater than about 4%, of the collective areas of all of the cooling apertures 50 disposed within the outer wall 30 portion of the same annular sub-region 48. Hence, the collective area of the plurality of at least partially covered inspection ports 54 within a given annular sub-region 48 is preferably within a range of about 2-10%, and more preferably within a range of about 4-6%, of the collective areas of all of the cooling apertures 50 disposed within the outer wall 30 portion of the same annular sub-region 48. In those instances wherein the inspection ports 54 in a given annular sub-region 48 are each partially covered by an inspection port cover 56, employing at least one and no more than four inspection ports 54 facilitates establishing the collective area of the remaining open portions to be equal to or less than the predetermined percentage value of the collective areas of all of the cooling apertures 50.

For those embodiments of the present disclosure liner 26 that include an inspection port cover 56, the cover 56 may assume a variety of different configurations. Typically, the inspection port cover 56 is configured to provide some amount of structural integrity to the liner 26 once attached to the liner 26. Preferably, the inspection port cover 56 is configured to provide an amount of structural integrity to the liner 26 upon attachment to the liner 26 that mitigates or eliminates any mechanical strength deficit within the liner 26 that may be associated with the uncovered inspection port 54. In some embodiments, the inspection port cover 56 has a configuration that is substantially the same as the outer wall 30 in the region of the inspection port 54. For example, if the portion of the outer wall 30 where the inspection port 54 resides has a corrugated configuration (e.g., periodic spaced apart troughs or ridges, etc.), then the inspection port cover 56 may have a similar configuration to facilitate its mating with the outer wall 30 surrounding the inspection port 54. In some instances, an inspection port cover 56 can be fabricated from a used liner of the same type that is no longer serviceable. Producing the inspection port cover 56 from a used liner of the same type greatly facilitates the process.

The present disclosure is not limited to any particular mechanism for attaching an inspection port cover 56 to an outer wall 30 of a liner 26. For example, an inspection port cover 56 may be attached to the outer wall 30 of the liner 26 using mechanical fasteners 58 such as screws, rivets, and the like. Alternatively, an inspection port cover 56 may be attached to the outer wall 30 of the liner 26 using a metallurgical attachment process such as welding, brazing, or other metallurgical attachment technique known in the art.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A liner for a gas turbine engine, comprising:
    an outer wall;
    an inner wall;
    wherein the outer wall is spaced apart from the inner wall and is disposed radially outside of the inner wall, the outer wall and inner wall forming an annular structure having a circumference, and an annular region disposed between a first interior surface of the outer wall and a second interior surface of the inner wall; and
    a plurality of structural elements disposed between the inner wall and the outer wall, and each of the plurality of structural elements is attached to the outer wall and the inner wall;
    wherein the outer wall includes at least one inspection port extending through the outer wall configured for access to the annular region disposed between the first interior surface of the outer wall and the second interior surface of the inner wall; and
    wherein the plurality of structural elements extend around the circumference of the annular structure, and define a plurality of independent annular sub-regions, and each of the plurality of independent annular sub-regions includes the at least one said inspection port disposed in a portion of the outer wall of a respective annular sub-region of the plurality of annular sub-regions;
        wherein the at least one inspection port in a respective one of the independent annular sub-regions is a plurality of said inspection ports, each said inspection port having a first area, and the collective first areas is a second area; and
        the respective one of the independent annular sub-regions includes an outer wall portion and a plurality of first cooling apertures disposed in the outer wall portion;
        wherein the plurality of first cooling apertures disposed within the outer wall portion have a collective third area, and the second area is less than ten percent (10%) of the third area.

2. The liner of claim 1, wherein each first cooling aperture of the plurality of first cooling apertures has a cooling aperture area and wherein the first area is greater than the second aperture area of any first cooling aperture of the plurality of first cooling apertures.

3. The liner of claim 1, wherein the at least one inspection port in each of the plurality of independent annular sub-regions is no more than four inspection ports.

4. The liner of claim 1, wherein the second area is less than six percent (6%) of the third area.

5. The liner of claim 1, wherein the second area is greater than two percent (2%) of the third area.

6. A gas turbine engine, comprising:
    a fan section, a compressor section, a combustor section, and a turbine section; and
    a liner disposed aft of the turbine section, the liner including:
    an outer wall;
    an inner wall;
    wherein the outer wall is spaced apart from the inner wall and is disposed radially outside of the inner wall, the outer wall and inner wall forming an annular structure having a circumference, and an annular region disposed between a first interior surface of the outer wall and a second interior surface of the inner wall; and
    a plurality of structural elements disposed between the inner wall and the outer wall, and each of the plurality of structural elements is attached to the outer wall and the inner wall;
    wherein the outer wall includes at least one inspection port extending through the outer wall configured for access to the annular region disposed between the first interior surface of the outer wall and the second interior surface of the inner wall; and
    wherein the plurality of structural elements extend around the circumference of the annular structure, and define a plurality of independent annular sub-regions, and each of the plurality of independent annular sub-regions includes the at least one inspection port disposed in a portion of the outer wall of a respective annular sub-region of the plurality of annular sub-regions;

wherein the at least one inspection port in a respective one of the independent annular sub-regions is a single said inspection port and has a first area; and the respective one of the independent annular sub-regions includes an outer wall portion and a plurality of first cooling apertures disposed in the outer wall portion;

wherein the plurality of first cooling apertures disposed within the outer wall portion have a collective second area, and the first area is less than ten percent (10%) of the second area.

7. The engine of claim 6, wherein each first cooling aperture of the plurality of first cooling apertures has a cooling aperture area and wherein the first area is greater than the cooling aperture area of any first cooling aperture of the plurality of first cooling apertures.

* * * * *